US008645334B2

(12) United States Patent
Leppard

(10) Patent No.: US 8,645,334 B2
(45) Date of Patent: Feb. 4, 2014

(54) MINIMIZE DAMAGE CAUSED BY CORRUPTION OF DE-DUPLICATED DATA

(76) Inventor: Andrew Leppard, Greenacres (AU)

(*) Notice: Subject to any disclaimer, the term of this patent is extended or adjusted under 35 U.S.C. 154(b) by 723 days.

(21) Appl. No.: 12/395,362

(22) Filed: Feb. 27, 2009

(65) Prior Publication Data
US 2010/0223495 A1    Sep. 2, 2010

(51) Int. Cl.
*G06F 17/30* (2006.01)

(52) U.S. Cl.
USPC .......................................................... 707/692

(58) Field of Classification Search
USPC .......................................................... 707/692
See application file for complete search history.

(56) References Cited

U.S. PATENT DOCUMENTS

| 5,990,810 | A | 11/1999 | Williams | |
|---|---|---|---|---|
| 7,203,731 | B1* | 4/2007 | Coates et al. | 709/214 |
| 7,568,188 | B2* | 7/2009 | Fathalla | 717/135 |
| 7,814,129 | B2* | 10/2010 | Williams | 707/812 |
| 7,962,706 | B2* | 6/2011 | Davis | 711/158 |
| 2005/0028026 | A1* | 2/2005 | Shirley et al. | 714/6 |
| 2006/0282457 | A1* | 12/2006 | Williams | 707/102 |
| 2009/0013129 | A1* | 1/2009 | Bondurant | 711/115 |
| 2009/0132619 | A1* | 5/2009 | Arakawa et al. | 707/205 |
| 2009/0177855 | A1* | 7/2009 | Drews et al. | 711/162 |
| 2009/0217091 | A1* | 8/2009 | Miyamoto et al. | 714/19 |
| 2009/0259701 | A1* | 10/2009 | Wideman et al. | 707/206 |
| 2010/0094817 | A1* | 4/2010 | Ben-Shaul et al. | 707/697 |
| 2010/0205389 | A1* | 8/2010 | Kishi | 711/162 |

OTHER PUBLICATIONS

Article entitled "From Adelaide to the World" by Sharwood, dated Mar. 7, 2007.*
Manual entitled "Blocklets" by Rocksoft, dated Jul. 2004.*
"DXi-Series Disk Backup Systems with Data De-Duplication: Providing Comprehensive Data and System Integrity", *Quantum Technical Brief*, www.quantum.com, 2007.

* cited by examiner

*Primary Examiner* — Mahesh Dwivedi

(57) ABSTRACT

An embodiment for minimizing damage caused by corruption of de-duplicated data is disclosed. One embodiment counts the number of references to a data segment indexed by a de-duplication index. When a reference count for the data segment reaches a first threshold a duplicate of the data segment is generated. In addition, the duplicate of the data segment is also stored to minimize damage of the de-duplicated data caused by a corruption of the data segment.

8 Claims, 5 Drawing Sheets

400

```
COUNT REFERENCES TO A DATA SEGMENT, THE DATA SEGMENT INDEXED
BY A DE-DUPLICATION INDEX.
410
            │
            ▼
GENERATE A DUPLICATE OF SAID DATA SEGMENT WHEN A NUMBER OF THE
REFERENCES TO THE DATA SEGMENT REACHES A THRESHOLD.
420
            │
            ▼
STORE THE DUPLICATE OF THE DATA SEGMENT TO MINIMIZE DAMAGE OF
THE DE-DUPLICATED DATA CAUSED BY A CORRUPTION OF THE DATA
SEGMENT.
430
```

FIG. 4

# MINIMIZE DAMAGE CAUSED BY CORRUPTION OF DE-DUPLICATED DATA

BACKGROUND

In a data storage system, often a large portion of data stored is repetitive data. Repetitive data is data which is potentially unnecessarily duplicated within the data storage system. Consider an example where an electronic message ("e-mail") is sent to 100 recipients, it may be stored 100 times in a data storage system. All but the first instance of this e-mail constitute some amount of repetition. In another example, multiple copies of slightly different versions of a word processing document are stored in a data storage system. A large portion of each of the documents is likely to constitute repetition of data stored in conjunction with one or more of the other instances of the word processing document.

De-duplication is sometimes used to reduce the amount of repetitive data stored in a data storage system. De-duplication often involves hashing data segments to identify duplicate data segments, then replacing an identified duplicate data segment with a smaller reference such as a pointer, code, dictionary count, or the like, which references a data segment, pointer, or the like stored in or referenced by a de-duplication library or index. In this manner, typically one copy of a duplicated data segment is saved and indexed as a reference, thus allowing other instances of the data segment to be deleted and replaced with a reference or pointer to the indexed data segment. By removing duplicated data in this fashion, storage efficiency can be improved and considerable space can be freed up within a data storage system.

However, if an indexed data segment becomes corrupted, such as due to a media failure or some other reason, the impact of the corruption is not typically limited to the single corrupt data segment. Instead, the scope of the problems caused by the corruption is multiplied by the number of times that the data segment has been referenced to de-duplicate data segments elsewhere in the data storage system. For example, it is possible for a heavily used or popular data segment to be present in, and thus de-duplicated from, thousands or millions of locations within a data storage system. In such a case, all of the thousands or millions of storage locations which were de-duplicated would become corrupt if the data segment which was referenced to de-duplicate those locations became corrupted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment for minimizing damage caused by corruption of de-duplicated data is disclosed. One embodiment counts the number of references to each data segment. When a reference count for the data segment reaches a first threshold a duplicate of the data segment is generated. In addition, the duplicate of the data segment is also stored to minimize damage of the de-duplicated data caused by a corruption of the data segment. If either copy of the data segment is corrupted, it can be recovered from the other copy.

DESCRIPTION OF THE DRAWINGS

The accompanying drawings, which are incorporated in and form a part of this specification, illustrate embodiments of the subject matter and, together with the description, serve to explain principles discussed below.

FIG. 4 shows flow diagram of a method for duplicating an often accessed data segment used by a de-duplication engine, according to an embodiment.

Figure 1:
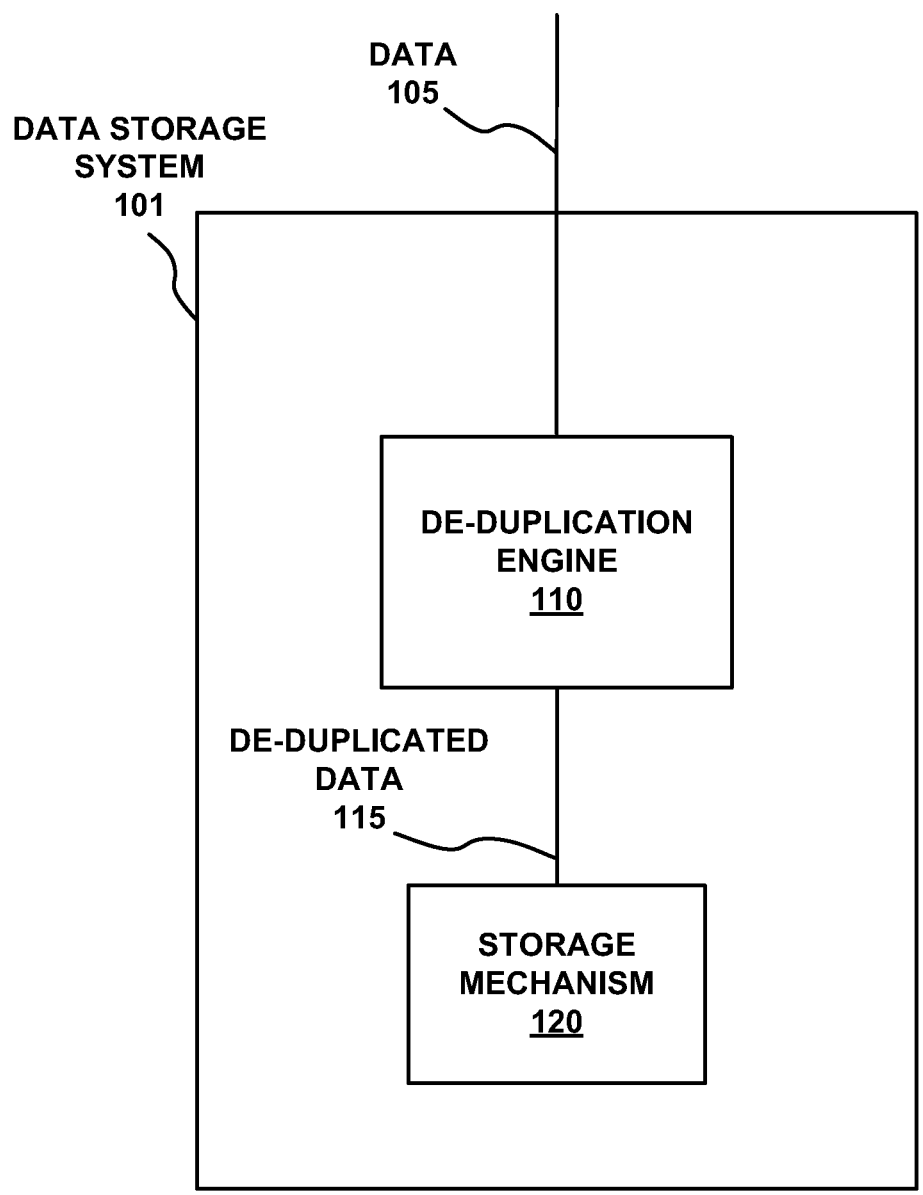
FIG. 1 is a block diagram of an example data storage system, in accordance with an embodiment.

The drawings referred to in this description should be understood as not being drawn to scale unless specifically noted.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following detailed description, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the detailed description, discussions utilizing terms such as "identifying," "searching," "replacing, " "setting," "performing," "storing," "producing," "comparing," "monitoring," "checking," "generating," "re-generating," "determining," or the like, refer to the actions and processes of a computer system, de-duplication engine, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices. In some embodiments, as described herein, a de-duplication engine resides within and/or is coupled with a data storage system or a computer system. In some embodiments, a de-duplication engine, as described herein, is implemented all or in part as a hardware device, such as a circuit card, circuit board, or an application specific integrated circuit. In some embodiments, a de-duplication engine, as described herein, is implemented all or in part as a virtual device in the form of computer executable instructions executed on a processor to cause the processor to perform one or more functions of the de-duplication engine.

Overview of Discussion

In storage systems, communication systems, and other devices, systems, and situations which use data de-duplication, a data segment is typically indexed in some manner and then referenced to de-duplicate duplicate data segments which are identical to the data segment. This index and the data segment are typically maintained in or referenced by the de-duplication engine which uses the data segment to perform de-duplication and to reconstruct/reproduce original data when such de-duplicated data is retrieved from storage. It is common practice for de-duplication software to maintain a reference count for each sub-block. The reference count keeps track of the number of times that the sub-block is contained in all blocks. This allows de-duplication software to remove sub-blocks from storage if they are no longer referenced by any block.

However, as previously stated, if an indexed data segment becomes corrupted, such as due to a media failure or some other reason, the impact of the corruption is not typically limited to the single corrupt data segment. Instead, the scope of the problems caused by the corruption is multiplied by the number of times that the data segment has been referenced to de-duplicate data segments elsewhere in the data storage system. For example, it is possible for a heavily used or popular data segment to be present in, and thus de-duplicated from, thousands or millions of locations within a data storage system. In such a case, all of the thousands or millions of storage locations which were de-duplicated would become corrupt if the data segment which was referenced to de-duplicate those locations became corrupted.

One way around this problem is to store two or more copies of all data as reference, in case one copy becomes corrupted. Unfortunately, this severely impacts the efficiency of data de-duplication as it doubles the amount of data stored, which effects both speed performance and efficiency of de-duplication. Moreover, if data is not highly repetitive (and thus conducive to high efficiencies of de-duplication), storage of multiple copies of all or much of the data as reference can actually cause data de-duplication to use more storage space for storing data than would be used if no de-duplication had been performed.

Another technique for minimizing damage caused by a corrupted data segment used by a de-duplication engine, which doesn't suffer from this ballooning storage problem, is described herein. In brief, this technique takes advantage of the reference count by duplicating popular data segments. For example, popular data segments are data segments with a reference count at or over a defined threshold (e.g., a "duplication threshold"). In one embodiment, once a data segment's reference count reaches this threshold, a copy of the data segment is also stored. In one embodiment, the copy of the data segment is stored on a different disk, file-system or node. Optionally, after the data segment passes the duplication threshold, if the data segment becomes less popular and its referenced count falls to or below a different threshold (e.g., a "de-duplication threshold") then the copy is removed.

In one embodiment, the de-duplication threshold is less than the original duplication threshold to minimize churn. In other words, since a data segment's reference count could naturally oscillate over a range of reference counts as blocks are added and removed from storage. Having two distinct and offset thresholds helps minimize the probability that a data segment is copied, the copy is removed, and then made again, etc., during the reference count's natural oscillation.

By utilizing the above method, if a duplicated data segment becomes corrupt, it can be restored or replaced by its copy. Similarly, if the copy of the data segment becomes corrupt, it can be restored or replaced using the original version. For example, in one embodiment, de-duplication software maintains an index of data segment identifiers. This index is required to de-duplicate copies of data segments. Advantageously, in one embodiment, the index is also used to keep track of the copies as well as the original data segment. Thus, if a duplicated data segment becomes corrupt, the de-duplication software's existing index can be used to find any copies of the data segment. Similarly, if the duplicated data segment becomes less popular and falls below the de-duplication threshold, the index can be used to find the copy to be deleted.

In another embodiment, more than one copy of popular data segments may be stored. For example, in a simple scenario, one embodiment stores more copies of popular data segments than less popular data segments. For example unique data segments may be stored twice, and popular data segments (e.g., having a higher reference count) may be stored three or more times. An embodiment utilizing this scenario would make the software even more resilient to data corruption especially, for example, in archival situations where data might be stored for very long periods of time.

In yet another embodiment, multiple duplication thresholds (and optionally multiple de-duplication thresholds) may be utilized. In so doing, the more reference counts a data segment has, the more copies of the data segment are stored. One embodiment, implements the scenario by maintaining multiple discrete levels of duplication thresholds (e.g. store 1 copy of data segments with a reference count over 2, two copies of data segments with a reference count over 4, three copies of data segments with a reference count over 8, etc.). Thus, the number of copies of each data segment is a function of its reference count. For example, in one embodiment, the function is a log function where the number of copies of each data segment is proportional to the log of its reference count.

Another embodiment utilizes the reference count copy duplication threshold without de-duplicating any data segments. In this case, the number of copies of each data segment stored is equal to, or greater than, the number of data segments encountered. In other words, storage space is traded for increased protection against data corruption. Again, an embodiment may be especially useful in archival situations where data can be stored for a very, very long period of time. Since, the more popular a data segment, the more copies are stored.

In general, a data segment includes a data file, a sub-block of a data file or other data block, and/or a collection of sub-blocks. In various embodiments, data segments can vary in length or be of uniform length, depending upon nuances of the de-duplication which is used and particular operation of a de-duplication engine. A sub-block comprises a natural or a deterministic sub-portion of the data of a larger data block such as a Binary Large Object (BLOB). For example, in one embodiment with respect to a word processing file which comprises a data block, a sub-block can comprise a smaller portion of the data of the data block. The size of this smaller portion of the data block can be of some pre-determined length (which may vary) or can be determined by occurrence of some data, event, or symbol within the data block, such as occurrence of a period or a carriage return. It is appreciated that these are only some examples of the formation of sub-blocks and that other mechanisms and techniques may be used to break data files or blocks into smaller sub-blocks.

Discussion will begin with a description of an example data storage system and a de-duplication engine with which, or upon which, embodiments described herein may operate. Components of the data storage system and the de-duplication engine will be described. Operation of an example de-duplication engine will then be described in more detail in conjunction with a description of an example method for minimizing damage caused by corruption of data segments used by de-duplicating engines.

Example Data Storage System

With reference now to FIG. 1, a block diagram of a data storage system 101 is shown in accordance with an embodiment. In one embodiment, data storage system 101 comprises a de-duplication engine 110 which is communicatively coupled with a storage mechanism 120. Data 105, which comprises one or more data segments, is received for storage by storage system 101. Within data storage system 101, data 105 is received by de-duplication engine 110, which performs de-duplication on received data 105 to remove some amount of duplicated data segments and produce de-duplicated data 115. After storage in storage mechanism 120 as de-duplicated data 115, all or a portion of data 105 can accessed from or provided by data storage system 101. When data 105 is accessed or provided, in one embodiment, de-duplication engine 110 operates in reverse to reconstruct data 105 from de-duplicated data 115 which is stored in storage mechanism 120.

Storage mechanism 120 comprises at least one data storage mechanism, and in some embodiments comprises a plurality of data storage mechanisms. Storage mechanism 120 can comprise a variety of data storage mechanisms. In one embodiment, for example, storage mechanism 120 comprises at least one hard disk drive. In one embodiment, storage mechanism 120 comprises at least one solid state disk (SSD). In one embodiment, storage mechanism 120 comprises at least one non-volatile random access memory (NVRAM). In one embodiment, storage mechanism 120 comprises at least one tape drive. In one embodiment, storage mechanism 120 comprises storage in a volatile or non-volatile solid state storage, such as, for example a data cache, memory, or solid state mass storage. In one embodiment, storage mechanism 120 comprises a plurality of disks or other storage devices arranged in a redundant storage array which offers data protection, such as a redundant array of independent disks (RAID). In another embodiment, storage mechanism 120 comprises a combination of storage devices.

De-duplication engine 110 operates to perform de-duplication of data stored in storage mechanism 120. Techniques for data de-duplication are well known in the art. However, in general, de-duplication engine 110 identifies a duplicated data segment within data 105 by a technique, such as, for example, hashing the data segment to obtain a hash value associated with the data segment. This hash value is then compared to other hash values generated from other data segments of data 105 and and/or other hash values which have previously been generated for data which has already been processed for de-duplication and stored within storage mechanism 120. The hash is a cryptographic mechanism for producing a code or data string (the hash value) which represents the data. When an appropriate hash is used, a sufficiently long hash value is generated which is very likely to be unique to a particular data segment. By making the statistical likelihood of uniqueness high enough, data segments which hash to matching hash values can be assumed to be identical data segments.

During data de-duplication, all but one of a plurality of identical data segments can be deleted and replaced with a reference, code, pointer or the like which directs to an unaltered copy of the data segment which is maintained in data storage system 101 or at some other location. In various embodiments, this original data segment can be stored in a data segment storage, which can be located in storage mechanism 120, in de-duplication engine 110, and/or in some other storage mechanism or location. In some embodiments, multiple copies of the data segment may be stored and/or indexed by de-duplication index 240. In some embodiments, the hash value (or some portion thereof) which is associated with the data segment is stored in a de-duplication index with a code or a pointer which references the storage location of the data segment. In other embodiments, the hash value (or some portion thereof) is stored at a location separate from the pointer, such as with the data segment.

Figure 2:
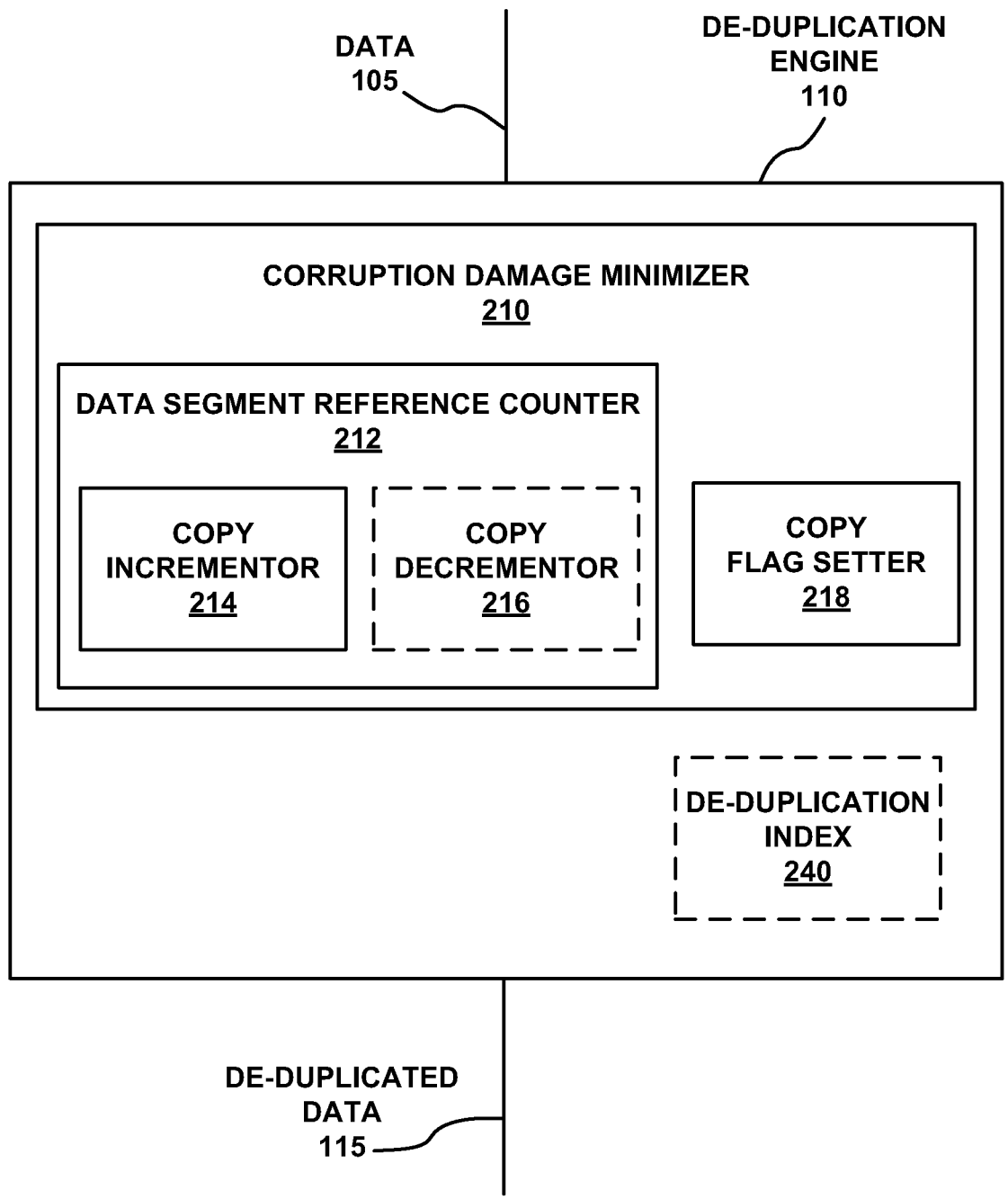
FIG. 2 shows block diagram of an example de-duplication engine, according to an embodiment.

FIG. 2 shows a block diagram of an example de-duplication engine, according to an embodiment. In one embodiment, de-duplication engine 110 comprises corruption damage minimizer 210, data segment reference counter 212, and de-duplication index 240; all of which are communicatively coupled with one another, to facilitate interoperation and the exchange of information within de-duplication engine 110. In one embodiment, these illustrated components/modules operate identify and repair a corrupt data segment used by de-duplication engine 110 during de-duplication of data 105 into de-duplicated data 115.

It is appreciated that the functions performed by the illustrated components and/or modules of de-duplication engine 110 can, in some embodiments, be consolidated, split apart, and even performed by additional components/modules. It is also appreciated that, in some embodiments, de-duplication engine 110 can have a greater number of components, lesser number of components, and/or different components/modules than those illustrated in FIG. 1. However, for clarity of explanation, the functions of the components/modules of de-duplication engine 110 will be described in accordance with one embodiment including the associated components/modules which are illustrated in FIG. 2.

Corruption damage minimizer 210 operates to identify a data segment as being popular or often referenced. The data segment is one which is indexed by a de-duplication index, such as de-duplication index 240. In various embodiments, the data segment can comprise a file, a data block, a sub-block, or some other unit of data. To minimize the damage that any corrupt data segment could cause in the de-duplication environment, corruption damage minimizer 210 utilizes a data segment reference counter 212 to monitor the reference count for each data segment. When the number of references for a particular data segment reaches a threshold number of references, the importance or popularity of the data segment in the de-duplication environment is increased such that a second copy of the data segment is stored.

In other words, the higher the number of references for a particular data segment, the bigger the scope of damage to the de-duplicated data if the data segment becomes corrupt. To minimize the scope of damage any one data segment can cause, corruption damage minimizer 210 tracks the references to each data segment and authorizes the storage of additional or duplicate copies of the popular data segments.

For example, in one embodiment, a data segment is considered popular after achieving a reference count of 100. In an alternate embodiment, the number of copies of a data segment stored is variably related to the popularity of the data segment. For example, a data segment having a reference count of 100 may have a single additional copy stored, while a data segment having a reference count of 1000 may have a plurality of additional copies stored.

In one embodiment, data segment reference counter 212 comprises a copy incrementor 214 and a copy decrementor 216. In one embodiment, copy incrementor 214 increments the number of copies of a data segment stored as de-duplicated data 115. In other words, once a data segment reaches or exceeds the duplication threshold reference count, data segment reference counter 212 will notify copy incrementor 214 to increment the number of copies of the stored data segment. For example, if the duplication threshold is set at a reference count of 100, when data segment reference counter 212 recognizes a data segment has reached the duplication threshold, copy incrementor 214 will increase the number of copies of the data segment stored in de-duplicated data 115. In another embodiment, the number of copies of a data segment stored is variably related to the popularity of the data segment. For example, a data segment having a reference count of 100 may have a single additional copy stored, while a data segment having a reference count of 1000 may have a plurality of additional copies stored.

In contrast, copy decrementor 216 decreases the number of copies of a data segment stored as de-duplicated data 115. In other words, once a data segment reaches or drops below a de-duplication threshold reference count, data segment reference counter 212 will notify copy decrementor 216 to decrement the number of copies of the stored data segment. For example, if the de-duplication threshold is set at a reference count of 50, when data segment reference counter 212 recognizes a data segment has dropped down to the de-duplication threshold, copy decrementor 216 will decrease the number of copies of the data segment stored in de-duplicated data 115.

In one embodiment, the de-duplication threshold is less than the duplication threshold to minimize churn. In other words, as stated herein, a data segment's reference count could naturally oscillate over a range of reference counts as blocks are added and removed from storage. Having two thresholds minimizes the probability that a data segment is copied; the copy is removed, and then made again. For example, if a single threshold (e.g., 100) was utilized, if the reference count was oscillating between 98 and 103, the data segment would constantly be copied and the copy removed, e.g., churn. However, by offsetting the thresholds, such as outside of the range of the natural oscillation, the churn would be minimized.

In one embodiment, corruption damage minimizer 210 includes a copy flag setter 218 which operates to set an original flag and a copy flag. For example, flags may be associated with the data segment or otherwise mark or identify that a data segment includes at least one additional stored copy. In one embodiment, the flags may comprise one or more bits in data segment storage and/or de-duplication index that are associated with the identified data segment. Copy flag setter 218 sets the flags when an additional copy of the data segment has been added. In one embodiment, copy flag setter 218 also resets or removes the flags when any additional copies of the data segment are removed. In one embodiment, copy flag setter 218 only matches against the original data segment stored. In another embodiment, if multiple levels of duplication are being utilized (e.g., more than one copy is being stored), a counter may be used to keep track of the number of copies outstanding. In one embodiment, the counter may be used instead of the copy flag. In another more redundant embodiment, the counter and copy flag may be used in conjunction.

In one embodiment, de-duplication engine 110 comprises de-duplication index 240. Typically a data de-duplication index, such as de-duplication index 240, indexes or strives to index only unique data segments. However, in one embodiment, the duplication of a popular data segment is also indexed by de-duplication index 240. De-duplication index 240 can be maintained all or in part in cache memory associated with de-duplication index 240 or at a storage location (such as within storage mechanism 120) which is associated with de-duplication index 240. In other embodiments, de-duplication index 240 is maintained separately from de-duplication engine 110 and is accessed by or linked to de-duplication engine 110. In one embodiment, de-duplication index 240 comprises an index of data segment identifiers which are associated with a plurality of data segments which have been used for de-duplicating other data segments during a de-duplication process performed by de-duplication engine 110. For example, a data segment which has been identified as an additional copy of a data segment by data segment reference counter 212 (or some other integrity checking process) comprises one of the pluralities of data segments which are indexed by de-duplication index 240. In one embodiment, a data segment identifier of de-duplication index 240 comprises a hash value that has been generated from and for the data segment, such as during a de-duplication process.

Figure 5:
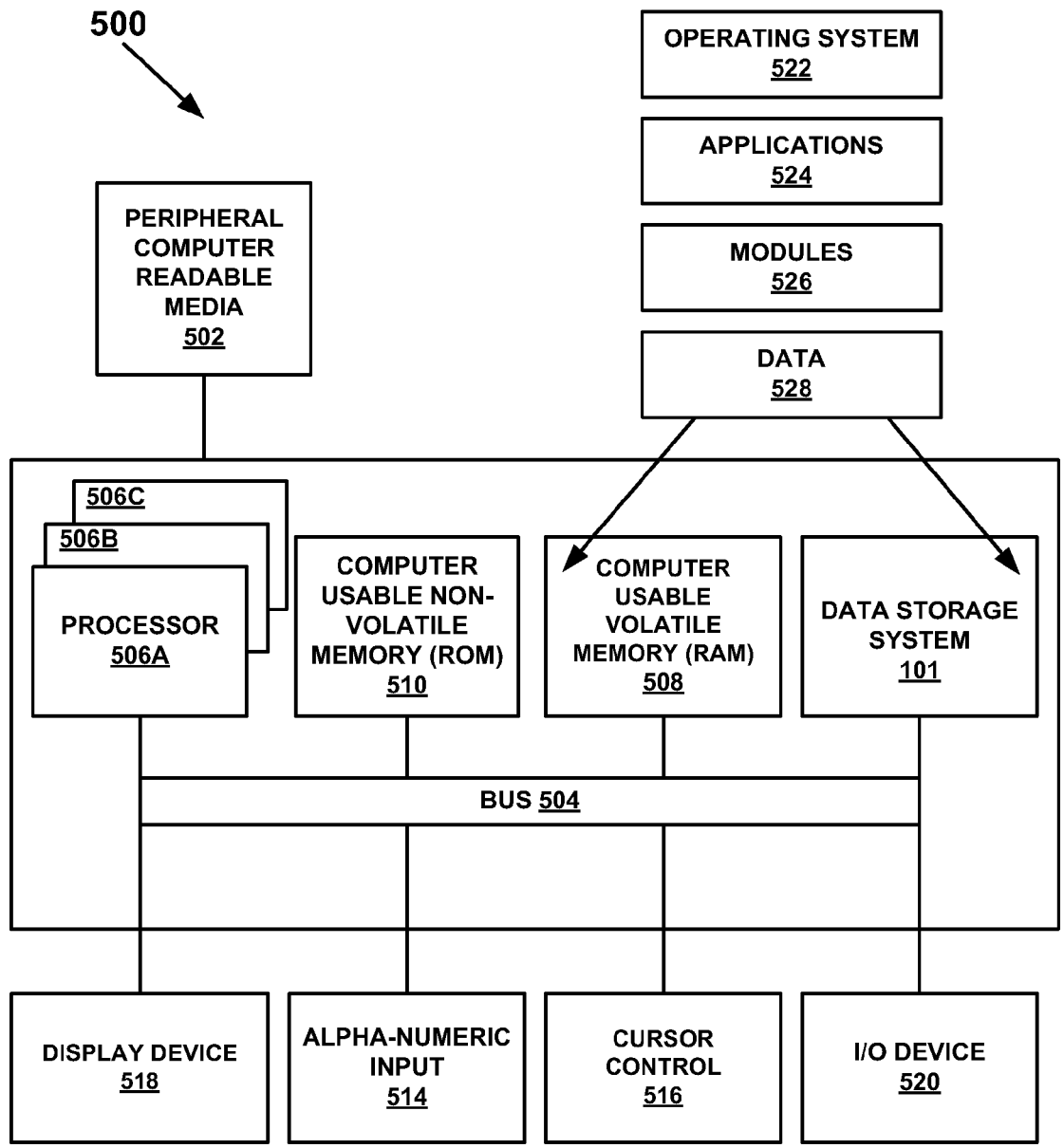
FIG. 5 shows a block diagram of an example computer system with which or upon which an embodiment described herein can be practiced.

In one embodiment, de-duplication engine 110 is implemented all or in part as a hardware device such as an Application Specific Integrated Circuit (ASIC), integrated circuit, data storage system controller card/board (e.g., a RAID controller), circuit card/board or the like. In other embodiments, all or some portion of the functionality of de-duplication engine 110 can comprise a virtual device implemented as instructions which are executed by a processor, such as a microcontroller/processor of a data storage system controller card/board, or such as a processor of computer system 500 (FIG. 5). This virtual device performs all or some part of the functions of the components/modules of de-duplication engine 110. In an embodiment where all or a portion of de-duplication engine 110 is being implemented as a virtual device, the processor, when executing instructions read from a computer readable medium, performs a function of at least one component/module of de-duplication engine 110.

Figure 3:
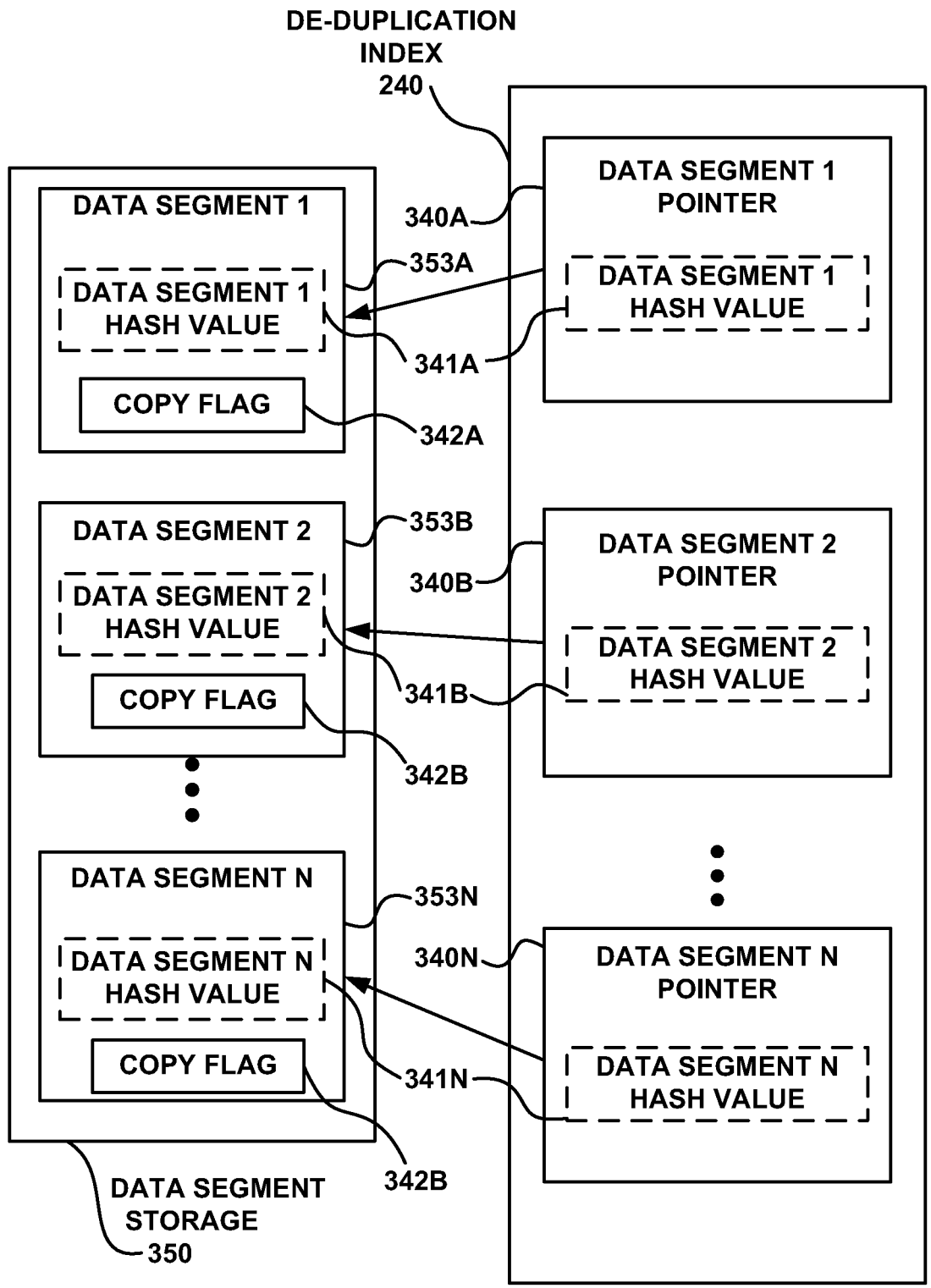
FIG. 3 shows an example block diagram of a de-duplication index and a data segment storage, according to an embodiment.

FIG. 3 shows an example block diagram of de-duplication index 240 and data segment storage 350, according to an embodiment. In one embodiment, data segment storage 350 comprises a storage location, such as a data cache or a portion of storage mechanism 120 which is set aside for storing data segments which are used by de-duplication engine 110 for data de-duplication. In one embodiment, data segment storage 350 comprises a collection of the storage locations at which original/reference data segments have been stored during the ordinary course of storing de-duplicated data 115.

In one embodiment, data segment storage 350 also includes a copy flag (342A, 342B, 342N) associated with each data segment. In general, setting a copy flag, such as copy flag 342A, identifies that an associated data segment, such as data segment 353A, has at least one additional copy stored or is a copy of an original data segment.

Resetting or not setting the copy flag indicates that the associated data segment does not have an additional copy stored, or is not an additional copy. For example, if the data segment drops below the de-duplication threshold, the additional stored copy is removed and the copy flag on the original data segment would be reset. In one embodiment, the additional copy is stored on a different disk, file-system or node.

As shown in FIG. 3, in one embodiment de-duplication index 240 comprises a plurality of data segment pointers 340A, 340B, 340N, which each point to storage location of a particular data segment (of a plurality of data segments) which is referenced for use in data de-duplication performed by de-duplication engine 110. For example, data segment pointer 340A points to or references the storage location of data segment 353A in data segment storage 350; data segment pointer 340B points to or references the storage location of data segment 353B in data segment storage 350; and data segment pointer 340N points to or references the storage location of data segment 353N in data segment storage 350.

In one embodiment, a data segment identifier (341A, 341B, 341N), such as a hash value, is associated with a data segment. This can comprise storing the data segment identifier (341A, 341B, 341N) with the data segment which it identifies, in de-duplication index 240, or in both locations. In the embodiment illustrated by FIG. 3, data segment identifiers 341A, 341B, and 341N are illustrated as hash values. Each data segment identifier 341A, 341B, 341N is stored either in conjunction with its associated data segment (353A, 353B, 353N) or in de-duplication index 240 in association with a pointer (340A, 340B, 340N) to a data segment represented by a respective data segment identifier, or in both locations. It is appreciated that in other embodiments, a data segment identifier may be stored at another location.

With reference to FIG. 4, flow diagram 400 illustrates example procedures used by various embodiments. Although a specific flow of procedures is disclosed in flow diagram 400, such a flow is provided as an example. That is, embodiments are well suited to performing various other procedures or variations of the procedures recited in flow diagram 400. It is appreciated that the procedures in flow diagram 400 may be performed in an order different than presented, and that not all of the procedures in flow diagram 400 may be performed in every embodiment.

Moreover, flow diagram 400 includes procedures that, in various embodiments, are carried out by a processor under the control of computer-readable and computer-executable instructions. The computer-readable and computer-executable instructions for executing the method and/or procedure illustrated by flow diagram 400 resides, for example, in any tangible computer-readable media, such as data storage features internal or external to storage system 101, volatile memory 508 (FIG. 5), and/or non-volatile memory 510 (FIG. 5). For example, in one embodiment, the computer-readable and computer-executable instructions, reside on computer-readable media such as a Read Only Memory (ROM) or firmware of a microcontroller or processor which, is/are used to perform the functions of, or operate in conjunction with, for example, de-duplication engine 110. In another example, such computer-readable and computer-executable instructions may reside on a computer-readable storage media such as a diskette (e.g., a Compact Disc Read Only Memory (CD-ROM)) used to control operation of a processor in a computer system (e.g., computer system 500) which is coupled with storage system 101 and/or de-duplication engine 110.

FIG. 4 shows a flow diagram 400 of an example method for duplicating an often referenced data segment used by a de-duplication engine, according to an embodiment. Reference will be made to components/modules and portions of FIGS. 1, 2, and 3 to assist in the description of the procedures of the method illustrated by flow diagram 400.

At 410 of flow diagram 400, one embodiment counts references to a data segment, indexed by a de-duplication index. For example, popular data segments are data segments with a reference count at or over a defined threshold (e.g., a "duplication threshold"). What is meant by "indexed by a de-duplication index" is that the data segment is included in or referenced by a de-duplication index, such as de-duplication index 240, for use by a de-duplication engine in the process of de-duplicating other data segments. In one embodiment, this identification is performed by corruption damage minimizer 210 of de-duplication engine 110. For example, with reference to FIG. 3, in one embodiment, data segment reference counter 212 of corruption damage minimizer 210 will utilize a reference threshold to determine if the data segment is considered popular.

In another embodiment, determinations of whether or not a data segment is popular are made by establishing that a data segment is referenced at least a threshold number of times over a certain time period. For example, data segment reference counter 212 can be incremented each time a reference to a data segment occurs. Some examples of a reference include, but are not limited to: a reference or access to the data segment for de-duplicating an identical data segment; a reference or access to re-construct a de-duplicated data segment with the data segment; a reference or access to backing up data or transferring a de-duplicated data segment which references a data segment, and the like.

At 420 of flow diagram 400, one embodiment generates a duplicate of the data segment when a number of the references to the data segment reach a threshold. The duplicate data segment comprises a copy of the data segment which has been identified as being often used.

At 430 of flow diagram 400, one embodiment stores the duplicate of the data segment to minimize damage of the de-duplicated data caused by a corruption of the data segment. In other words, both the original data segment and the duplicate of the data segment are stored. In one embodiment, the copy of the data segment is stored on a different disk, file-system or node with respect to the original data segment. Optionally, after the data segment passes the duplication threshold, if the data segment becomes less popular and its referenced count falls to or below a different threshold (e.g., a "de-duplication threshold") then the copy is removed.

In one embodiment, the de-duplication threshold is less than the original duplication threshold to minimize churn. In other words, since a data segment's reference count could naturally oscillate over a range of reference counts as blocks are added and removed from storage. Having two distinct and offset thresholds helps minimize the probability that a data segment is copied, the copy is removed, and then made again, etc., during the reference count's natural oscillation.

By utilizing the above method, if a duplicated data segment becomes corrupt, it can be restored or replaced by its copy. Similarly, if the copy of the data segment becomes corrupt, it can be restored or replaced using the original version. For example, in one embodiment, de-duplication software maintains an index of data segment identifiers. This index is required to de-duplicate copies of data segments.

Advantageously, in one embodiment, the index is also used to keep track of the copies as well as the original data segment. Thus, if a duplicated data segment becomes corrupt, the de-duplication software's existing index can be used to find any copies of the data segment. Similarly, if the duplicated data segment becomes less popular and falls below the de-duplication threshold, the index can be used to find the copy to be deleted.

In another embodiment, more than one copy of popular data segments may be stored. For example, in a simple scenario, one embodiment stores more copies of popular data segments than less popular data segments. For example unique data segments may be stored twice, and popular data segments (e.g., having a higher reference count) may be stored three or more times. An embodiment utilizing this scenario would make the software even more resilient to data corruption especially, for example, in archival situations where data might be stored for very long periods of time.

In yet another embodiment, multiple duplication thresholds (and optionally multiple de-duplication thresholds) may be utilized. In so doing, the more reference counts a data segment has, the more copies of the data segment are stored. One embodiment, implements the scenario by maintaining multiple discrete levels of duplication thresholds (e.g. store 1 copy of data segments with a reference count over 2, two copies of data segments with a reference count over 4, three copies of data segments with a reference count over 8, etc.). Thus, the number of copies of each data segment is a function of its reference count. For example, in one embodiment, the function is a log function where the number of copies of each data segment is proportional to the log of its reference count.

Another embodiment utilizes the reference count copy duplication threshold without de-duplicating any data segments. In this case, the number of copies of each data segment stored is equal to, or greater than, the number of data segments encountered. In other words, storage space is traded for increased protection against data corruption. Again, an embodiment may be especially useful in archival situations where data can be stored for a very, very long period of time. Since, the more popular a data segment, the more copies are stored.

Example Computer System Environment

FIG. 5 shows a block diagram of an example computer system 500 according to an embodiment. With reference now to FIG. 5, portions of the subject matter comprise or can comprise computer-readable and computer-executable instructions that reside, for example, in computer-usable media of a computer system. That is, FIG. 5 illustrates one example of a type of computer that can be used to implement embodiments of the subject matter which are discussed herein. FIG. 5 illustrates an example computer system 500 used in accordance with embodiments of the subject matter. It is appreciated that computer system 500 of FIG. 5 is an example, and that the subject matter can operate on or within a number of different computer systems including general purpose networked computer systems, embedded computer systems, optical computer systems, virtual computer systems, database systems, server devices, client devices, various intermediate devices/nodes, stand alone computer systems, and the like. As shown in FIG. 5, computer system 500 of FIG. 5 is well adapted to having peripheral computer readable media 502 such as, for example, a floppy disk and drive, a compact disc and drive, a digital versatile disk and drive, and the like coupled thereto.

Computer system 500 of FIG. 5 includes an address/data bus 504 for communicating information, and a processor 506A coupled to bus 504 for processing information and instructions. As depicted in FIG. 5, computer system 500 is also well suited to a multi-processor environment in which a plurality of processors 506A, 506B, and 506C are present. Conversely, computer system 500 is also well suited to having a single processor such as, for example, processor 506A. Processors 506A, 506B, and 506C may be any of various types of microprocessors.

Computer system 500 also includes data storage features such as a computer usable volatile memory 508, e.g. random access memory (RAM), coupled to bus 504 for storing information and instructions for processors 506A, 506B, and 506C. Computer system 500 also includes computer usable non-volatile memory 510, e.g. read only memory (ROM), coupled to bus 504 for storing static information and instructions for processors 506A, 506B, and 506C. Also present in computer system 500 is a data storage system 101 (e.g., one or more magnetic disks and drives, optical disks and drives, and/or solid state storage units such as flash memory) coupled to bus 504 for storing information and/or instructions.

Computer system 500 also includes, in one embodiment, an optional alphanumeric input device 514 including alphanumeric and function keys coupled to bus 504 for communicating information and command selections to processor 506A or processors 506A, 506B, and 506C. Computer system 500 also includes, in one embodiment, an optional cursor control device 516 coupled to bus 504 for communicating user input information and command selections to processor 506A or processors 506A, 506B, and 506C. Computer system 500 of the present embodiment also includes, in one embodiment, an optional display device 518 coupled to bus 504 for displaying information.

Referring still to FIG. 5, optional display device 518 may be a liquid crystal device, cathode ray tube, plasma display device or other display device suitable for creating, presenting, or displaying graphic images and/or symbols or alphanumeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick, directional and input keys on a multimedia remote control, or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. Computer system 500 is also well suited to having a cursor directed by other means such as, for example, voice commands.

Computer system 500 also includes, in one embodiment, an I/O device 520 for coupling computer system 500 with external entities. For example, in one embodiment, I/O device 520 is a modem for enabling wired or wireless communications between computer system 500 and an external network such as, but not limited to, the Internet.

Referring still to FIG. 5, various other components are depicted for computer system 500 and may be included in various embodiments. Specifically, when present, an operating system 522, applications 524, modules 526, and data 528 are shown as typically residing in one or some combination of computer usable volatile memory 508, e.g. random access memory (RAM), and data storage system 101. In some embodiments, the subject matter discussed herein is stored, for example, as an application 524 or module 526 in memory locations within RAM 508, computer readable media within data storage system 101, and/or peripheral computer readable media 502.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method, comprising:
controlling a data de-duplication process to receive a data segment;

controlling the process to compute a de-duplication hash for the data segment;

controlling the process to access a de-duplication index, where the de-duplication index comprises keys and values, where the de-duplication index is configured to be accessed using the de-duplication hash as a key, and where the de-duplication index is configured to store references to unique data segments available to the process;

controlling the process to determine whether the de-duplication hash for the data segment is present in the de-duplication index;

upon determining that the de-duplication hash is not present in the de-duplication index:

controlling the process to store the data segment on a first storage device as a unique instance of the data segment;

controlling the process to store, in the de-duplication index, information sufficient to locate the data segment as stored on the first storage device; and controlling the process to set to an initial value a reference count associated with the data segment; and upon determining that the de-duplication hash for the data segment is present in the de-duplication index:

controlling the process to update the reference count associated with the data segment; and upon determining that the reference count associated with the data segment exceeds a threshold:

controlling the process to store the data segment on a second storage device as an additional instance of the data segment; where controlling the process to update the reference count includes selectively not updating the reference count if the data segment was not received within a threshold period of time after the receipt of a previous instance of the data segment; and controlling the computer to store, in the de-duplication index, information sufficient to locate the data segment as stored on the second storage device.

2. The method of claim 1, where the data segment is a variable length segment whose boundaries are determined, at least in part, by the de-duplication process using a rolling hash.

3. The method of claim 1, where the de-duplication hash is a cryptographic hash.

4. The method of claim 1, where the first storage device is one of, a hard disk drive, a solid state drive, a non-volatile random access memory, a tape drive, and a non-volatile solid state storage device.

5. The method of claim 4, where the second storage device is a different storage device than the first storage device, and where the second storage device is one of, a hard disk drive, a solid state drive a non-volatile random access memory, a tape drive, and a non-volatile solid state storage device.

6. The method of claim 1, where the threshold is greater than the initial value, and where the threshold is a function of the reference count.

7. The method of claim 1, where controlling the process to store, in the de-duplication index, information sufficient to locate the data segment as stored on the first storage device comprises storing in a value field located using the de-duplication hash as a key, a reference to the data segment.

8. The method of claim 7, where controlling the process to store in the de-duplication index, information sufficient to locate the data segment as stored on the second storage device comprises storing, in the value field, a second, different reference to the data segment.

\* \* \* \* \*

UNITED STATES PATENT AND TRADEMARK OFFICE
CERTIFICATE OF CORRECTION

| | | |
|---|---|---|
| PATENT NO. | : 8,645,334 B2 | Page 1 of 1 |
| APPLICATION NO. | : 12/395362 | |
| DATED | : February 4, 2014 | |
| INVENTOR(S) | : Andrew Leppard | |

It is certified that error appears in the above-identified patent and that said Letters Patent is hereby corrected as shown below:

In the Claims:

In column 14, line 20, delete "drive a non-volatile" and insert --drive, a non-volatile--.

In column 14, line 31, delete "store in" and insert --store, in--.

Signed and Sealed this
Seventh Day of October, 2014

Michelle K. Lee
*Deputy Director of the United States Patent and Trademark Office*